(No Model.)
H. R. WALLACE.
HORSE DETACHER.
No. 263,261. Patented Aug. 22, 1882.
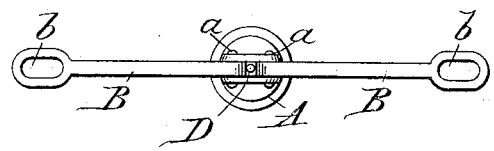
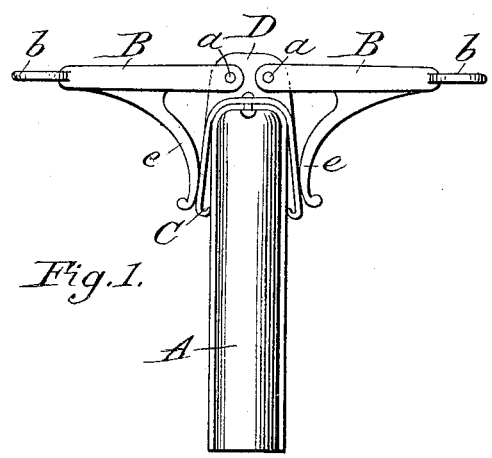
Attest:
F. H. Schott
Jno. A. Stockman
Inventor.
Henry R. Wallace

UNITED STATES PATENT OFFICE.

HENRY R. WALLACE, OF CHICAGO, ILLINOIS.

HORSE-DETACHER.

SPECIFICATION forming part of Letters Patent No. 263,261, dated August 22, 1882.

Application filed October 27, 1881. (No model.)

*To all whom it may concern:*

Be it known that I, HENRY R. WALLACE, a citizen of the United States, residing at the city of Chicago, in the county of Cook and State of Illinois, have invented an Improved Thimble for Carriage Tongues or Shafts, of which the following is a specification.

My invention consists of a thimble or sleeve which slips over the end of the tongue or shafts of the vehicle, and to which the forward part of the harness is hitched, all of which is fully illustrated in the accompanying drawings, in which—

Figure 1 is a sectional view of a thimble or sleeve as arranged for vehicles provided with tongues. Fig. 2 is an end view of the same.

Similar parts are referred to by similar letters of reference throughout the several views in the drawings.

A represents a thimble made of a suitable size to slip snugly over the end of a tongue of a carriage or other vehicle. In a slot, D, at the end of this thimble and hinged at $a$ $a$ are two pieces, B B, provided at their outer ends with eyes $b$ $b$, in which are hitched the breast-straps of the harness. Running through the slot D and secured at its center by a rivet, $c$, is a spring, C, the ends of which rest against the braces $e$ $e$ on the pieces B B and press them forward, keeping the breast-straps taut, and by this means assist in steadying the tongue when passing over rough ground and preventing it from striking the horses' legs.

Having thus described my invention, what I claim as new, and desire to secure by Letters Patent, is—

In combination with a carriage-tongue, the detachable sleeve or thimble A, provided with pivoted arms B B, having eyes $b$ $b$ and braces $e$ $e$, and the spring C, substantially as shown and described.

HENRY R. WALLACE.

Witnesses:
FRANK JOHNSON,
PAUL A. STALEY.